United States Patent
Shao et al.

(10) Patent No.: US 7,191,150 B1
(45) Date of Patent: Mar. 13, 2007

(54) ENHANCING DELINQUENT DEBT COLLECTION USING STATISTICAL MODELS OF DEBT HISTORICAL INFORMATION AND ACCOUNT EVENTS

(75) Inventors: Min Shao, San Diego, CA (US); Scott Zoldi, San Diego, CA (US); Gordon Cameron, Brookhaven, PA (US); Ron Martin, San Diego, CA (US); Radu Drossu, San Diego, CA (US); Jenny (Guofeng) Zhang, San Diego, CA (US); Daniel Shoham, San Diego, CA (US)

(73) Assignee: Fair Isaac Corporation, San Diego, CA (US)

( * ) Notice: Subject to any disclaimer, the term of this patent is extended or adjusted under 35 U.S.C. 154(b) by 547 days.

(21) Appl. No.: 09/607,747

(22) Filed: Jun. 30, 2000

Related U.S. Application Data

(60) Provisional application No. 60/179,533, filed on Feb. 1, 2000.

(51) Int. Cl.
   *G06Q 40/00* (2006.01)
(52) U.S. Cl. .......................... 705/38; 705/35; 705/36 R
(58) Field of Classification Search ............. 705/35–40
   See application file for complete search history.

(56) References Cited

U.S. PATENT DOCUMENTS

| | | | | |
|---|---|---|---|---|
| 5,619,709 A | * | 4/1997 | Caid et al. ................... 715/532 |
| 5,774,883 A | | 6/1998 | Andersen et al. ............. 205/38 |
| 5,893,072 A | | 4/1999 | Zizzamia ....................... 705/4 |
| 5,991,733 A | * | 11/1999 | Aleia et al. .................... 705/8 |
| 6,098,052 A | * | 8/2000 | Kosiba et al. ................ 705/40 |
| 6,119,103 A | | 9/2000 | Basch et al. .................. 705/35 |
| 6,513,018 B1 | * | 1/2003 | Culhane ....................... 705/35 |
| 2002/0116245 A1 | * | 8/2002 | Hinkle et al. .................. 705/8 |

FOREIGN PATENT DOCUMENTS

| | | | |
|---|---|---|---|
| JP | 2004213286 A | * | 7/2004 |
| WO | WO 2004029850 A2 | * | 4/2004 |

OTHER PUBLICATIONS

Cutler et al "Forecasting in a large macroeconomic system", Applied Economics, Oct. 20, 2000.*

Schmidt, M.B. "The Dynamic behavior of wages and Prices:Cointegration of Tests within a large Macroeconomic System", Southern Economic Journal, Jul. 2000.*

* cited by examiner

*Primary Examiner*—Hyung Sub Sough
*Assistant Examiner*—Narayanswamy Subramanian
(74) *Attorney, Agent, or Firm*—Michael Glenn; Glenn Patent Group

(57) ABSTRACT

A predictive model, for example, a neural network, evaluates individual debt holder accounts and predicts the amount that will be collected on each account based on learned relationships among known variables. The predictive model is generated using historical data of delinquent debt accounts, the collection methods used to collect the debts in the accounts, and the success of the collection methods. In one embodiment, the predictive model is generated using profiles of delinquent debt accounts summarizing patterns of events in the accounts, and the success of the collection effort in each account. In another embodiment, the predictive model includes a mathematical representation of the collector's notes created during the collection period for each account.

51 Claims, 6 Drawing Sheets

ENHANCING DELINQUENT DEBT COLLECTION USING STATISTICAL MODELS OF DEBT HISTORICAL INFORMATION AND ACCOUNT EVENTS

CROSS REFERENCE TO RELATED APPLICATIONS

Pursuant to 35 U.S.C. § 119(e), this application claims the benefit of U.S. Provisional Patent Application Ser. No. 60/179,533, entitled "Enhancing Delinquent Debt Collection Using Statistical Models of Debt Historical Information and Account Events, Collection Methods, Collectors, Collection Notes, Collection Action, and Collection Resources", by Shoham et al., filed Feb. 1, 2000, the subject matter of which is herein incorporated by reference in its entirety.

This application is related to U.S. Pat. No. 5,819,226, entitled "Fraud Detection using Predictive Modeling," by Gopinathan et al., filed Sep. 9, 1992; U.S. Pat. No. 5,619,709, entitled "System and Method of Context Vector Generation and Retrieval," by Caid et al., filed Nov. 21, 1995; U.S. patent application Ser. No. 08/971,091, entitled "System and Method for Optimal Adaptive Matching of Users to Most Relevant Entity and Information in Real-Time", by Lazerus et al., filed Nov. 14, 1997; and U.S. patent application Ser. No. 09/306,237, entitled "Predictive Modeling of Customer Financial Behavior", by Lazerus et al., filed May 6, 1999 each of which are commonly assigned with the present application. The subject matter of each of these related applications is incorporated by reference herein in its entirety.

BACKGROUND

1. Field of Invention

The present invention relates generally to the optimization of strategies for collecting and recovering on delinquent debt accounts, and more particularly, to an automated system that uses predictive modeling to optimize the use of various collection resources on a portfolio of delinquent debt accounts, including for example credit card accounts.

2. Background of the Related Art

A significant portion of the debts that people incur are not repaid in a timely fashion. The term "debt" as used herein may refer to credit card debt, loan debts, unpaid bills, or a variety of other types of debt or credit obligation. A delinquent debt is any such debt that has not been repaid by its due date, or a debt in which one or more installment payments have been missed. Debt issuers typically employ various different methods to collect on these delinquent debts, either in full or in part.

Assume for purposes of example that a debtor stops making monthly payments on his credit card debt. Typically, the credit card company will use various collection methods, such as letters and phone calls, to encourage the customer to pay. However, once the account is 180 days overdue, it attains the legal definition of a non-performing debt and must be charged off. Subsequent efforts to collect the debt are known as "recoveries." At this point, the credit card company may continue to work the debt in-house, or may elect to sell the debt to a contingency collection agency.

Such delinquent debts are often sold for pennies on the actual dollar value of the debt. A variety of existing analytical methods are currently used to evaluate the net present value (NPV) of a delinquent debt, and to determine how to maximize the NPV of each debt. Current analytical measures of the collectability of a delinquent debt include: behavior scores, bureau scores, and payment projection scores. Although these measures all provide some information about a delinquent debt account, they all suffer different limitations on their usefulness.

Behavior scoring is based on the activities of a delinquent credit cardholder that are visible to the card issuer. The primary source of relevant behavior information used in existing scores comes from payment information (during the time the cardholder was still paying): Has the cardholder been making minimum payments only? What is the ratio of full payments to minimum payments over the past 12 months? What is the account holder's spending-to-paying ratio?

Unfortunately, behavior scoring data becomes stale by the time many collection efforts are initiated. After the authorization stream is shut down, and after the cardholder has stopped making payments, the only "transactions" posted to the account are late charges, interest charges, more interest charges, etc. These transactions are not measures of the cardholder's behavior during the debt collection process. Thus, as delinquent debt collection efforts proceed, the behavior scoring data quickly becomes outdated.

Credit bureau data provides information on what the delinquent account customer is doing elsewhere, for example, if he is delinquent on other debts as well as the current debt. However, credit bureau information also suffers from a data staleness problem due to the lag time in credit bureau information reporting. For example, it typically takes approximately four months from the date of the customer's last timely payment for the credit bureau information to indicate that something is amiss with the customer's account.

Payment projection scores are used to estimate the likelihood that payments will eventually be made. These models are used in prioritizing collection cases to be worked. Currently available payment projection models rely on masterfile information, which typically contains information such as the account holder's name, address, social security number, and monthly balances. A variety of calculated quantities are generated from the masterfile. For instance, the 3-cycles rolling average balance may be calculated, or the sum of payments in the last 6 cycles as a percentage of the amount due in the last 6 cycles or percentage of the balance that is cash may be calculated. However, a problem with these variables is that there is no updating of these characteristics throughout the collection process. The same projections—only updated for the time that has passed—will be produced on day 120 as on day 30. Thus, there is no way for the payment projection score model to take advantage of information that is gleaned during the collection process itself. Furthermore, none of these currently existing measures of information about delinquent debt accounts provides information about the collection actions that will be most effective when used on a particular account. There is a wide variety of collection actions that can be taken, such as a letter, a phone call, or the sale of the debt to a collection agency. Typically, individual collectors review the delinquent accounts and select which accounts to work, and which methods to apply, based upon their previous collection experiences. However, this individualized method for evaluating collection efforts does not provide an automated and consistent method for evaluating collection actions among a group of delinquent debts.

Individually, collection specialists often rely on information contained in the account notes made by previous collectors to determine the recent actions taken on an account, such as letters sent and phone calls made. Additionally, account notes also often contain information about why the debtor has not paid; for example, he lost his job or she has been ill. Collection notes information is useful in deciding how best to work the account; for example, once a debtor tells creditors he has lost his job, the next collection specialist can call and inquire as to whether the debtor has found a new job yet. In later delinquency stages once the account has been shut off, collection notes may be the most current information about the account, and therefore collection specialists currently use this information in an individual capacity. However, because the collection notes are in text format, existing analytical methods are not able to quantify them.

What is needed is an improved method for analyzing delinquent debt accounts that uses available information about a debt holder to evaluate the likelihood of collecting on a delinquent debt. The method should also be able to evaluate the effectiveness of different collection actions, and use the information found in collector's notes as well.

SUMMARY OF THE INVENTION

The present invention provides an automated system and method for predicting the likelihood of collecting on a delinquent debt of an account. The system uses one or more predictive models, for example, a neural network, to evaluate individual debt holder accounts and predict the amount that will be collected on each account based on learned relationships among known variables.

In one embodiment, a predictive model is generated using historical data of delinquent debt accounts, the collection methods used to collect the debts in the accounts, and the success of the collection methods. In another embodiment, a predictive model is generated using profiles of delinquent debt accounts summarizing patterns of events in the accounts, and the success of the collection effort in each account.

In one embodiment, the predictive model includes a mathematical representation of the collector's notes created during the collection period for each account. The collector's notes are modeled using a vector representation that encodes contextual similarity, which is used to map the word space of collectors' notes. Each account's collector notes may then be quantified by their degree of relatedness with a certain area of collection word space, for example, "debtor explanations regarding health problems" or "debtor explanations regarding job loss." The measure of relatedness or the vector representation of the notes themselves are then used as inputs to the predictive model.

Variations of the predictive model may be used to calculate the net present value of a delinquent debt, the preferred collection action or preferred sequence of collection actions to use on a particular debt, or the most appropriate collection agent to work a particular debt. Additionally, the predictive model may be used to optimize the use of collection resources for a portfolio of delinquent debt accounts.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts. The term "debt" as used throughout this document is defined to encompass a wide variety of different types of debts or credit obligations, for example, credit card debt, medical debts, utility bills, bounced checks, electronic transaction (Internet) debt, personal loan debt, secured or unsecured loans, and other types of unpaid bills.

There are a large number of actions that may be taken when determining how to attempt to collect a delinquent debt. For example, a letter may be sent, a phone call may be made by a collection specialist, or no action at all may be taken. Letters and phone calls may be made at a variety of different times, and may target both the debtor's home and work locations. Electronic mail may also be used to contact a debtor. The debtor may be assessed late fees and penalties, and be offered debt counseling. The debtor may also be allowed to restructure the debt, forgive a portion of the debt, or borrow additional money. A skip trace search may be performed if the debtor is missing. Finally, legal action may be taken or the debt may be sold to a secondary collection agency.

The present invention includes a debt collection optimization system, which uses a predictive model to estimate the amount of a particular debt that will be recovered based upon information about the debt account and the collection actions taken on the account. The system gathers information and uses a predictive model to determine the optimal actions to use in debt collection.

1. Data Collection and Predictive Model Development Systems

Figure 1:
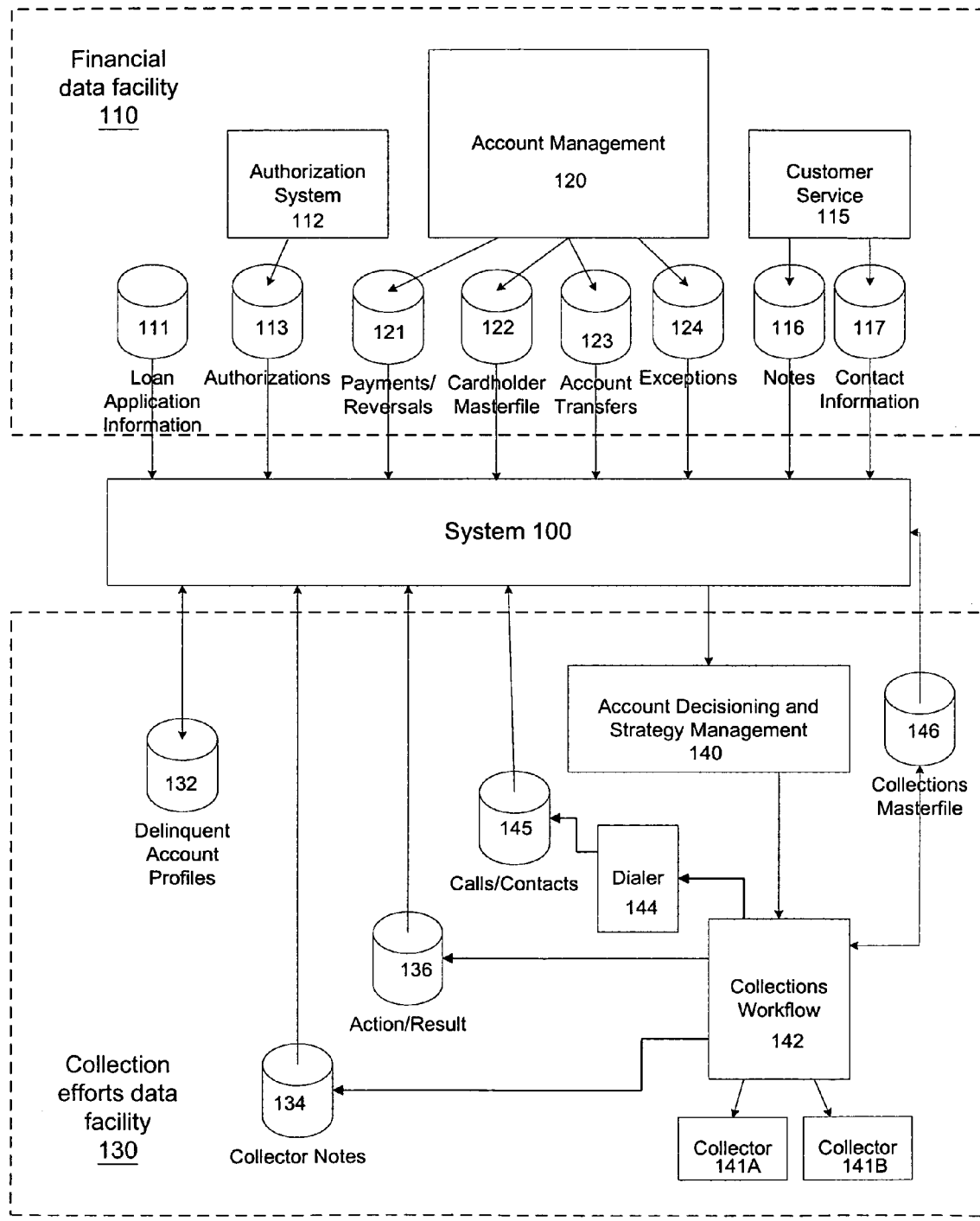
FIG. 1 is a block diagram of a financial data facility and a collections data facility in an embodiment of the present invention.

FIG. 1 is a block diagram of a financial data facility 110 and a collections data facility 130 in an embodiment of the present invention. FIG. 1 illustrates the types of information found in a credit card account type transaction facility for purposes of example. A credit card issuer company typically contains a financial facility to manage day-to-day credit card transactions, and a collections facility to handle accounts that have become overdue. It will be evident to one of skill in the art that various other types of debt accounts may include different types of information from those shown in FIG. 1.

The financial data facility 110 provides traditional credit card account information to a debt collection optimization system 100. Information about a credit card account is collected from an authorization system 112, an account management system 120, and a customer service system 115. Additionally, loan application information 111 is also collected.

The authorizations system 112 provides information about account authorizations 113 for credit card purchases. The account management system 120 provides information about account payments and reversals 121, a cardholder masterfile 122, account transfers 123, and account exceptions 124. The cardholder masterfile 122 typically contains information such as the account holder's name, address, and social security number. The account exceptions file 124 typically contains information about account instances outside of normal transactions, such as a request to re-send a lost account statement. The customer service system 115 provides notes 116 and contact information 117 from any interactions the account holder has had with the customer service division of the credit card issuer company.

The collection efforts data facility 130 provides information about accounts that have become delinquent to the debt collection optimization system 100. Information about delinquent accounts is collected from a collections masterfile 146, a calls/contacts file 145, an action/results file 136, a collectors' notes file 134, and delinquent account profiles 132. The collections masterfile 146 includes information such as the account holder's name, address, the date on which the debt was incurred, and the date on which the account became delinquent. The calls/contacts file 145 includes a record of calls made to the account holder and whether those calls successfully established contact with the delinquent account holder. The action/results file 136 includes a record of all collection actions taken on the account and the results generated from those actions (for example, payments made, additional fees charged, etc.) The collectors' notes file 134 includes notes and comments generated by collectors who have worked on the account. Collectors typically take notes regarding a debtor's explanations for delinquency and promises to pay. The delinquent account profiles 132 include a summarized pattern of events that have occurred in the lifetime of the account, as will be discussed later in further detail.

Information generated by the debt collection optimization system 100 is fed back into the collection efforts data facility 130 via an account decisioning and strategy management system 140. For example, system 100 may suggest a preferred collection action, group of actions, or a collection action sequence to use on a particular account, or a preferred collections specialist to work the account. Strategy management system 140 decisions, as well as information from the collections masterfile 146, are fed into the collections workflow system 142, which coordinates various actions taken to collect the debt.

The collections workflow system 142 selects a collector ("collection specialist") 141 to work on a particular account, and these specialists 141 generate additional collectors' notes 134. The collections workflow system 142 also recommends optimized actions to take on the account, adding to the action/result file 136. The collections workflow system 142, preferably in conjunction with a predictive dialer 144, assists collectors in making additional phone calls on the account, adding to the calls/contacts file 145.

It will be understood by one of skill in the art that many additional types of information may be used in the debt collection optimization system 100. For example, certain types of third-party information may be useful in modeling delinquent debt collection, including information from credit-reporting agencies, bankruptcy-reporting services, public records, marketing data suppliers, skip trace agencies, law enforcement authorities, and legal professionals. These examples and other types of information may be incorporated into the specific account information used to develop a predictive model for delinquent debt collection.

Alternatively, a more simplified financial data facility 110 or collection efforts data facility 130 may be used. For example, collectors may manually make phone contacts without the aid of a predictive dialer 144. The system 100 does not require all of the types of data inputs shown in FIG. 1 for developing and using a predictive model. The specific data inputs used in system 100 will depend on the desired predictive model complexity and particular areas of interest, as will be evident to one of skill in the art.

Figure 2:
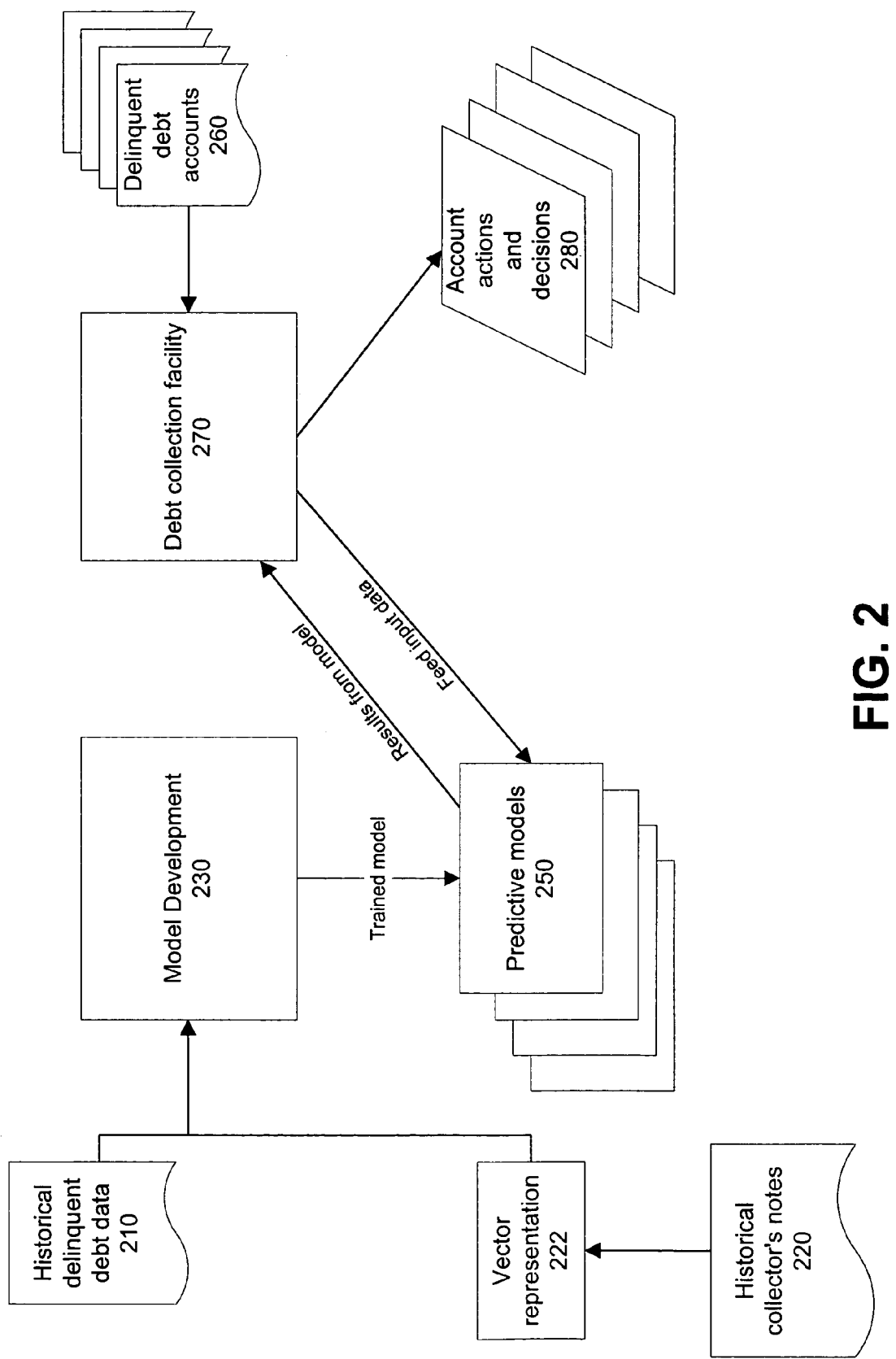
FIG. 2 is a diagram illustrating the process of training and using a predictive model in an embodiment of the present invention.

FIG. 2 illustrates an embodiment of the development and use of predictive models for delinquent debt collection. A set of historical data is selected for use in model development 230. A suitable set of data is selected wherein the data contains sufficient information to properly train the desired predictive model. Suitable criteria for inclusion in the historical dataset is developed, taking into account such factors as the type of account information historically available, and the type of information that will typically be available when making a prediction for a currently delinquent debt.

A selected set of historical delinquent debt data 210, including collection outcomes achieved on the accounts, is used for the model development process 230. Collection outcomes are typically represented as the money collected on an account. In one embodiment, historical collectors' notes 220, converted into a vector representation 222 that can be mathematically expressed, is also used in model development 230. The historical data is used to train a predictive model for delinquent debt collection. Multiple different types of predictive models may be developed, including neural networks, regression analysis, integrated rules systems, and decision tree models.

One example of a predictive model is a neural network containing various interconnected layers of processing elements. Each different historical delinquent debt record is used as an input into the neural net, with the outcome attained on each historical debt used as a comparison point with the neural net output. The strength of each connection between processing elements in the neural network is given by a weight. The weights associated with each connection between the processing elements have the ability to skew the output based upon the variability (or invariability) of a single input. The neural network is trained by properly adjusting the weights of each connection until the connections between each element are optimized to match historical outcomes based upon the set of historical inputs. The training and use of neural networks is described further in U.S. Pat. No. 5,819,226, the subject matter of which is herein incorporated by reference in its entirety.

It will be evident to one of skill in the art that other types of statistical predictive models may be used in place of a neural network. For example, a regression analysis, an integrated rules system, or a decision tree may all be used to develop predictive models for delinquent debt collection. Regression methodology, integrated rules systems and decision trees are all well known in the art, and methods for developing these types of predictive models will be evident to one of skill in the art.

Both linear and non-linear regression analysis may be used for predictive model development. In a linear regression, each input variable is assigned a weight that is computed based on the correlation of that variable, in the context of all the other variables, with the desired output in the data that was used to develop the model. Some weights may be negative. The model's computed output is the weighted-sum of all input variables. In a non-linear regression, additional derived variables representing nonlinear combination of the original input variables are created. For instance, additional derived variables may be the product of some of the original variables, or some of the original variables squared, cubed, or raised to higher powers. A linear regression model is then developed as described above using a combination of the original and derived variables.

An integrated rules system is a series of rigorous rules, expert-written or machine-produced, which are resolved thereby allowing actions to follow from the outcome of the resolution of the rules. For example, an individual rule might state: "If 3 or more letters have been sent in the last 60 days and no response received, consider rule 'ignored #1' to have fired." The integrated rules system might then have a rule that states: "If 2 or more 'ignored' rules fire and the outstanding debt is over $150, then utilize phone call script #6". In this example, "phone script #6" may be a specifically developed script for collectors to use with debtors who ignore communication efforts. The rules typically have tunable parameters ("3 letters," "60 days," "$150" "2 rules fired," etc.) that may be optimized using a typical statistical modeling paradigm.

A decision tree uses a selected input variable as a basis to subdivide the data population into two parts that are as equal in size as possible, such that the average value of the output variable in the two subdivided sections are as different from each other as possible. This process is repeated in each of the two parts, creating a 4-parts subdivision. The process continues until the total number of subdivided sections becomes sufficiently large or the statistical population of each section sufficiently small, that farther subdivision would be counterproductive.

The trained predictive model 250 is stored for use in delinquent debt predictive modeling. In one embodiment, a delinquent debt predictive model predicts the percentage likelihood of collecting on a delinquent debt. Multiplying the likelihood of collection times the face value of the debt produces the expected value of the delinquent debt. In another embodiment, the calculation of the expected value of the delinquent debt also considers the net-present-value of the debt, based on an estimate of how long it will take for the debt to be paid (in effect, taking into account the time value of money. This embodiment requires that the expected time until payment be predicted. In yet another embodiment, the expected value calculation also takes into account the time-value-corrected cost of subsequent collection actions. This embodiment further requires that the expected expense stream until payment be predicted.

Decisions about particular areas of debt collection, for example, the best action to take on an account, are optimized by comparing the debt valuations produced by the predictive model for different inputs. For example, if the action "send a letter to debtor" produces a debt value of $10.00 for a particular debt, whereas the action "call the debtor" produces a debt value of $300.00 for the same debt, then calling the debtor is the optimal action. This analysis may also take into account the different costs of various actions.

In another embodiment, multiple different types of specialized predictive models are created. For example, different predictive models may be created to predict: accounts in early delinquency that will self-cure (become current without intervention), straight roller accounts (accounts that will never be paid no matter what types of intervention are attempted), the correct collection specialist to work on a delinquent debt account, the optimum method of communicating with a delinquent debtor, the net present value of a debt, the best time to contact a debtor, and when authorization to shut off a delinquent account should be given. Each of the different predictive models has a different model target variable.

Once the predictive model or a set of predictive models 250 has been trained, the model(s) are used with current delinquent debt account information to make predictions about current debt accounts. A debt collection facility 270 collects information 260 relating to current delinquent debt accounts. Additional processing may be performed on the raw information to produce derived variables, if desired. The information regarding a particular delinquent debt is fed into one or more of the predictive models 250, and prediction results are returned to the debt collection facility 270. The predictive model results are used to help determine account actions and decisions 280 to take regarding the delinquent debt accounts.

As with all models, the ultimate outcome depends upon the set of input variables 260 used in constructing the model. A wide variety of variables may be used as inputs, for example, account purchase information, the Merchant Category Code (MCC/SIC) for purchases, the amount of purchases, cash transaction information, and account payments made. A representative set of derived variables suitable for use in constructing a predictive model includes:

Diff1=Referral Date−Original Charge-off Date
Diff2=Original Charge-off Date−Original Last Payment Date
Social Security Yes/No
In Statute Risk (status of the debt)
Number of Agency Placement Risk
State Risk
Rural/Urban Risk
Own/Rent Risk
Area Code Risk
Zip3 Risk
Diff1 Risk
Diff2 Risk
Face-value at Comment Date
Pay Percentage 12-months from Comment Date (model target, 0–100%)

The "risk" suffix for a variable indicates that instead of supplying the model with a binary "yes/no" answer input, the variable is converted to a number representing the risk calculated for each of the possible answers. For example, if 30% of all debt where the variable answer is "yes" and 50% of all debt where the variable answer is "no" is ultimately charged off, then the variable risk will be set to 30% and 50%, respectively, for these two potentialities.

The predictive model or set of predictive models for delinquent debt collection are used to implement a strategy for delinquent debt collection. For example, a predictive model for estimating the value of delinquent debt accounts is used to prioritize resources for contacting debtors, whereby resources are first expended on debts of higher predicted worth. Further optimization of the implemented strategy may be achieved through the use of a champion/challenger system.

A champion/challenger system is used to optimize strategy in a production environment (additionally, the system may be used in a development environment by simulating the production environment). The environment's strategy is the collection of rules, models, policies, workflow, and other metrics that define the overall operational strategy. The currently used strategy is referred to as the "champion" strategy, as it is presumably the best strategy know to the users by the existing criterion used to measure strategy performance. A competing strategy, potentially one that is indicated through the use of statistical optimization or simulation, or one that is created through a random variation from the champion strategy, is referred to as the "challenger" strategy.

The champion-challenger methodology is used to randomly assign a certain (typically small) percentage of the population of cases to be worked to the challenger strategy. The percentage chosen should be large enough so that results of statistic significance can be collected within a reasonable timeframe, yet small enough so that the potentially poorer performance of the untested challenger strategy does not have a large impact on overall portfolio performance. Typically, approximately 10% of the accounts in a portfolio would be assigned to be worked via the challenger strategy; occasionally multiple challenger strategies are employed simultaneously. If the performance of the challenger strategy proves itself superior to that of the champion strategy, then the original champion strategy is eliminated, the original challenger strategy becomes the new champion strategy, and a new challenger strategy is developed to test potential farther improvements in performance. Occasionally, the challenger strategy outperforms the champion strategy, but only on a specific, defined sub-segment of the case population (for example, only on accounts that are over 90 days overdue). In such a case, the challenger strategy replaces the champion strategy only for those case population sub-segments. The use and implementation of champion/challenger systems is well known and will be evident to one of skill in the art.

The system shown in FIG. 2 may be implemented using a standard computer system. A typical computer system will include a central processing unit, random access memory, data and program storage, and an output device. A computer system suitable for implementing the delinquent debt prediction system will be evident to one of skill in the art.

2. Profiles

FIG. 1 illustrates that the system used for delinquent debt management uses a variety of different data inputs. In one embodiment, a predictive model 250 uses profiling to combine selected information about an account into a summarized representation of that account. Profiles describe patterns of events in the historical information about a particular account. Events occurring over the lifetime of a delinquent debt account are not viewed as isolated, solitary incidents. Each event is part of a pattern; events impact—and sometimes cause—each other, and thus should be made part of a complete picture. For example, an inbound phone call from a debtor has an entirely different meaning if it is unprompted, as opposed to being a returned call after a message was left by a collector. A profile captures this sequence of events and interprets it properly.

Figure 3:
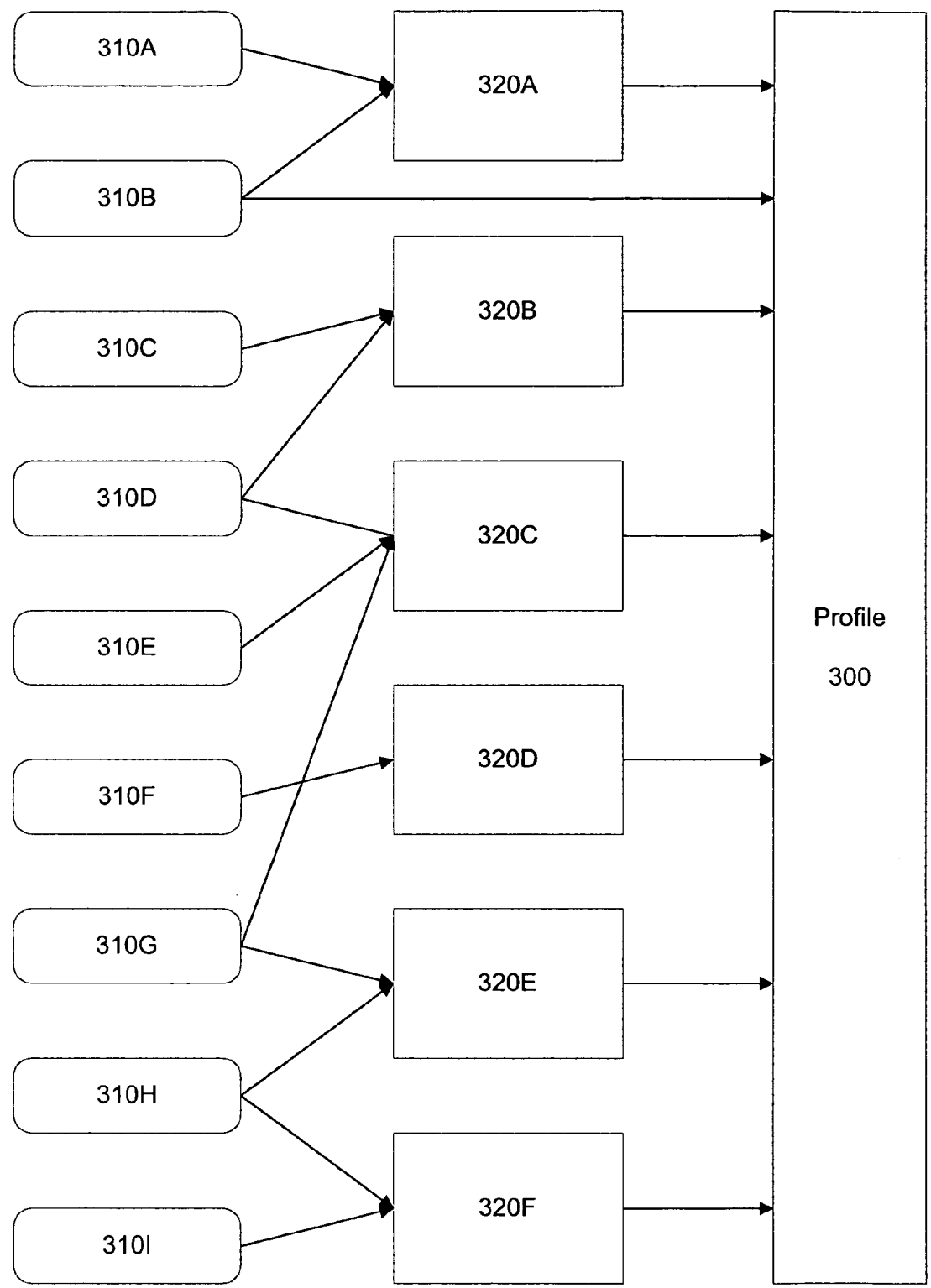
FIG. 3 is a block diagram of the elements used in creating a profile in an embodiment of the present invention.

FIG. 3 is a block diagram illustrating the creation of a profile 300. The profile 300 represents a delinquent debt account as a dynamic entity. A set of data 310A–I is collected regarding the account, for example, from the financial data facility 110 and the collection efforts data facility 130 shown in FIG. 1. These data inputs 310 are then used to create a set of derived variables 320A–F, which make up the profile 300. In delinquent debt account profiles, the profile 300 is initialized by pre-collection activities, such as the cardholder masterfile, authorizations, and historical payment information. The profile 300 is dynamically updated by each transaction or other interaction with the account holder, such as a phone call, a letter, or a debt payment. The profile 300, in addition to other static data sources, becomes the base data from which predictive statistical models 250 are built.

Predictive models 250 each combine the predictive information from a profile of an account to create a score that exploits the meanings in the interactions between pieces of information. In one embodiment, a statistical pattern recognition technology is used to develop a statistical predictive model that calculates an estimate of how likely a delinquent debt account is to pay, and a correlation of likely payment to estimated payment amount.

3. Context Vectors

The derived variables used in the predictive model are created from raw data such as address area codes, account purchases and payments, and payment dates, which are stored in numerical form. However, many key events in the lifecycle of a delinquent debt account are contained in the contacts made during earlier collection efforts. Collection specialists typically take notes with each phone call or other contact with the debtor, and use these notes as an aid in subsequent collection efforts. These notes may be taken as plain text, pseudo-text, or various internally developed, preformatted "codes." For example, some collection specialists use the shorthand "TR" to mean "telephoned residence," "TE" for "telephoned employment," and "DA" for "didn't answer." These notes are typically stored in text fields of the account record, but conventionally have not been subject to automated analysis.

It is desirable to provide a predictive model access to the textual information about collection actions by incorporating collectors' notes into the delinquent debt account profiles. A context mining process is used to transform the free-flow text of the collectors' notes into a mathematical representation that is well suited for statistical analysis. Each text construct—individual words, phrases, sentences, or even entire text sections—can be represented in the form of a high dimensional vector. Each word has a vector associated with it. Words that are "close" to each other in meaning have vectors that are topologically close to each other. Context vector topology is used to classify collectors' notes topologically and provide additional information about a delinquent debt account.

For example, collection specialists often prefer cases of temporary unemployment to cases of imminent bankruptcy. Temporary unemployment cases typically involve responsible account holders who fully intend to make good on their debts as soon as they obtain another job. As long as a collections specialist stays on top of the account, for example, by calling in periodically to inquire if a new job has been found, the repayment of the delinquent debt will likely remain a high priority for the debtor once a new job is found. Conversely, cases of imminent bankruptcy are less likely to lead to future debt repayment.

Thus, an optimized debt collection management system applies more resources to collection efforts on the accounts of unemployed debtors, and fewer resources on bankruptcy accounts. In order to be able to make such an optimization decision, the system predicts accounts containing phrases like "John lost job" or "Jane got downsized," as well as many other variants referring to unemployment, to be worthy of collection resource expenditures. Conversely, other accounts containing phrases referring to imminent bankruptcies will not indicate that an expenditure of collection resources is valuable. It will be evident to one of skill in the art that various other debtor categories may be tracked through the use of context mining of collector's notes.

Figure 4:
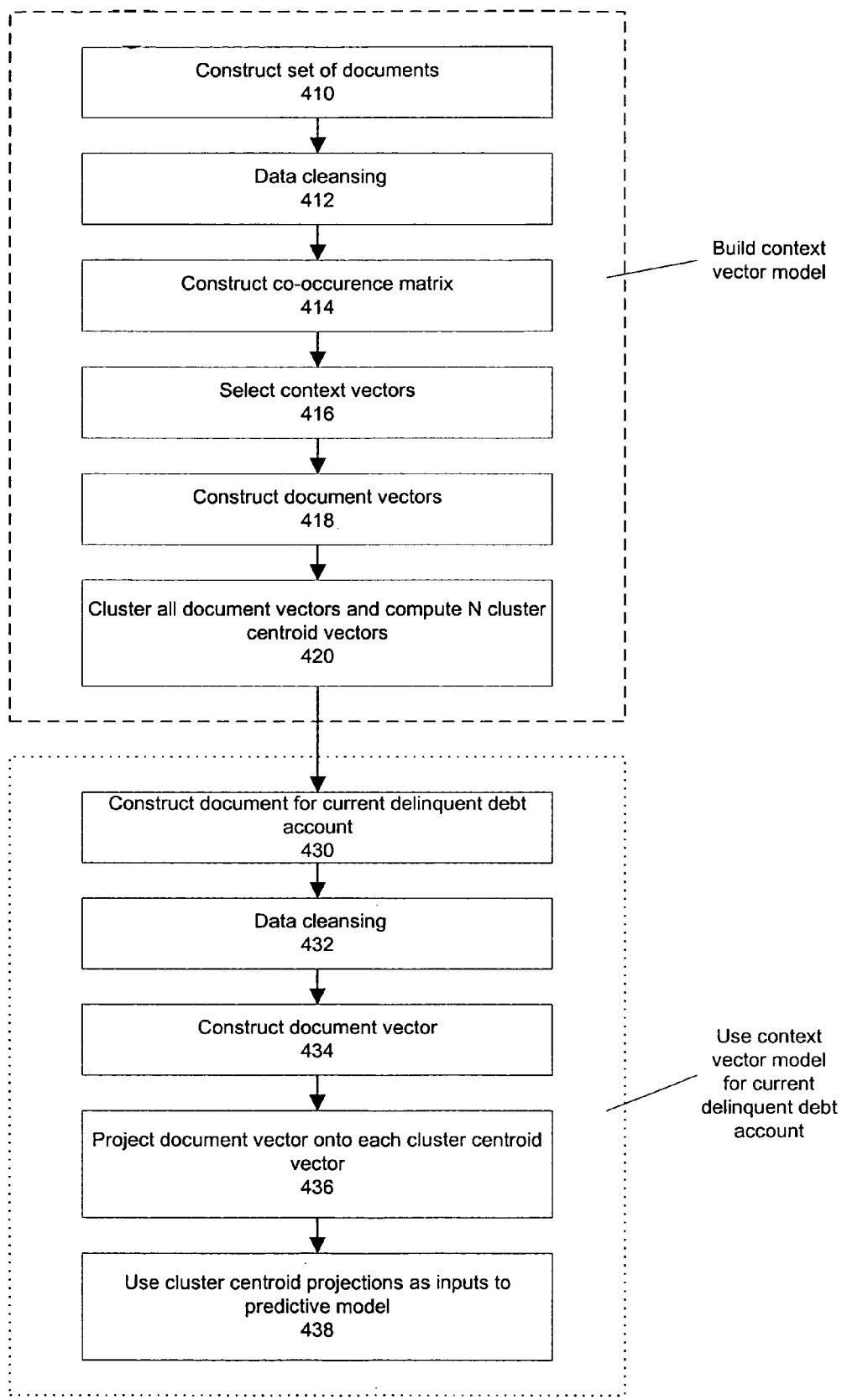
FIG. 4 is a flowchart of the generation of context vectors in an embodiment of the present invention.

FIG. 4 is a flowchart of a process for context vector generation in an embodiment of the present invention. In one embodiment, context vector generation is performed by context vector software that operates on the raw collectors' notes text. Using historical delinquent debt account information, a model of collectors' notes is built mathematically, representing different types of notes' subject matter as "cluster centroid vectors" in the word space of collectors' notes. Current delinquent debt accounts' collectors' notes are then mathematically transformed into vectors that are compared against the model's centroid vectors to determine subject matter similarities. The mathematical representation of a current debt account's collectors' notes is used as an input into a delinquent debt predictive model.

A set of documents is constructed 410 from historical information about delinquent debt accounts, for use in building a mathematical context vector model. Collectors' notes typically consist of many comments and each individual comment is preferentially characterized as a document. The first comment for an account becomes itself a first document. The second comment is merged with the first comment to become a second document for the account. This second document can correspond to a different value for other derived variables (for example, face value at comment date) for the account, because certain derived variables are computed from the date the comment was entered into the database. Likewise, the document construction process continues and the third comment for the account is merged with the first and second comments to form a third document.

Data cleansing 412 is then performed on the constructed documents $d_1, d_2, \ldots d_m$. Within the text there may be collection company specific codes, abbreviations, and misspelled words that may not convey immediate meaning. In typical collection specialist comments, over 90% of the content consists of abbreviations, codes, misspellings, and garbled text. Therefore, the formation of documents includes a data cleansing stage. This cleansing is accomplished by defining a concise vocabulary in which the documents are rewritten. This vocabulary is referred to as the "good words" list, and contains the most commonly occurring content carrying words in the documents. For example, words such as "the," "and," "man," and "says" do not convey much information compared to words such as "paid," "check," "mailed," and "hospital." The "good words" list also reduces the complexity of the context vectors and eliminates much erroneous contextual information. The second stage of data cleansing involves using an "exception words" list to replace words of similar meaning, abbreviations, and misspellings by a single word stem. An example of data cleansing of a collector's comments is provided in Table 1 below:

TABLE 1

Data cleansing using "good words" and "exception words" lists

| | COMMENT | DOCUMENT |
|---|---|---|
| 1 | TR AT 4:30 PM, SHE ON PHONE SD HER PHONE IS TRANSFERRED TO THE HOSPITAL WHERE HER MOM IS IN FOR MAJOR SURGERY SD SHE LOST TRACK OF THIS NOTE WHEN TEXAS AMERICAN BNK WENT UNDER AND SD THAT SHE DEALS WITH TEAM BNK AND HAS SINCE THE BNK WENT UNDER SD SHE WLD CL ME THE FIRST PART OF THE WEEK ON THIS | PHONE PHONE HOSPITAL MOM SURGERY LOST TRACK NOTE AMERICA BANK DEALS BANK BANK CALL WEEK |
| 2 | *THISD ACCT WAS A 91 DAY TERMS NOTE, ASSIGNMENT OF PROM NOTES IN THE AMOUNT OF14.762.00 AND 6992.00***THERE IS LAND IN OKLAHOMA THAT SECURES THIS, A131* THIS ACCT HAS NOT BEEN SUED, A131*** | PHONE PHONE HOSPITAL MOM SURGERY LOST TRACK NOTE AMERICA BANK DEALS BANK BANK CALL WEEK ACCT TERMS NOTE ASSIGNMENT PROMISE NOTES AMT LAND SECURES ACCT NOT SUED |
| 3 | TELE NUMBER STILL HOOKED UP TO HER MOTHERS HOSPITAL ROOM HER MOM ANSWERED THE PH SD SHE WLD BE IN LATER***WELL AT LEAST HER MOM SOUNDED PRETTY GOOD SO WE CAN GET ON WITH THIS ACCOUNT AND THE MONEY OWED, | PHONE PHONE HOSPITAL MOM SURGERY LOST TRACK NOTE AMERICA BANK DEALS BANK BANK CALL WEEK ACCT TERMS NOTE ASSIGNMENT PROMISE NOTES AMT LAND SECURES ACCT NOT SUED PHONE NUMBER MOM HOSPITAL ROOM MOM ANSWER PHONE MOM SOUNDED GOOD ACCT MONEY OWED |
| 4 | STO AT 3:15 PM, SD SHE POSS CLD PAY 1000.00 FOR 2 MNTHS AND THEN PIF ON THE THIRD MONTH SD SHE HAS A DEAL CLOSING AND SD SHOULD HAVE A NICE CK NEXT WEEK WILL CL ME ON TUESDAY *COME ON BIG BUCKS AND NO WAMMIES*** | PHONE PHONE HOSPITAL MOM SURGERY LOST TRACK NOTE AMERICA BANK DEALS BANK BANK CALL WEEK ACCT TERMS NOTE ASSIGNMENT PROMISE NOTES AMT LAND SECURES ACCT NOT SUED PHONE NUMBER MOM HOSPITAL ROOM MOM ANSWER PHONE MOM SOUNDED GOOD ACCT MONEY OWED POSS PAY DEAL CLOSING CHECK WEEK CALL |

Table 1 demonstrates several features of the data cleansing stage. In Table 1, for each comment listed the corresponding constructed document is also presented. Past information accumulates in documents 2, 3, and 4. The new appended information for each document is shown underlined. The data cleansing stage 412 can significantly reduce the amount of textual information stored without losing much contextual information. For example, in Table 1, documents are approximately 25% smaller than the combined raw comments. Further, Table 1 illustrates that the exception list was used to convert "BNK" into "BANK," "PH" into "PHONE," "CL" into "CALL," and "CK" into "CHECK." This conversion is important especially if many different people are inputting data and each refers to "CHECK" by different abbreviations "CH," "CHK," "CHCK," "C," etc. It will be understood by one of skill in the art that data cleansing 412 is a stage that requires some specialized collections knowledge to understand which words convey information about collections and to interpret common abbreviations and misspellings in the text data.

A co-occurrence matrix is constructed 414 for the words in the set of documents $d_1, d_2, \ldots d_m$. The context vector software collects documents and determines co-occurrences (words that appear commonly together) between sets of words within the documents. Co-occurrences are determined within a window of size w, where w indicates the number of words from which to infer content. For example, "sick can't pay" or "hospital bills no money" may occur commonly together and contain predictive information. Mathematically, the software forms a co-occurrence matrix to find relationships between all the words in the list of "good words." Words that appear often in the same context will be weighted more heavily in this matrix; this provides structure to the matrix (see Table 2 for an example).

TABLE 2

Example of Co-occurrence Matrix

|  | Hospital | No | Pay | Mail |
|---|---|---|---|---|
| Hospital | 56 | 45 | 30 | 3 |
| No | 45 | 200 | 100 | 34 |
| Pay | 30 | 100 | 450 | 189 |
| Mail | 3 | 34 | 189 | 310 |

The dimensionality of the co-occurrence matrix is the same as the number of "good words." If the number of good words is S, then the co-occurrence matrix will have a dimension of S*S. For example, using a list of 500 "good words" produces a co-occurrence matrix of size 500*500 word stems.

To extract the most meaningful textual relationships from this high-dimensional phase space, lower-dimensional context vector approximations are selected 416 from the larger co-occurrence matrix. Context vectors can be envisioned as the principle components of the co-occurrence matrix, or the most significant eigenvectors of the co-occurrence matrix. A context vector has a component corresponding to each word in the "good words" list and is expressed in terms of the weights of each word stem in the "good words" list (see Table 3).

TABLE 3

Example of a Context Vector

| 0.3 | 0.4 | 0.5 | 0.7 |
|---|---|---|---|
| Hospital | No | Pay | Mail |

The dimensionality of the context vector space determines the total number of context vectors. For example, if the d most significant eigenvectors are chosen, d defines the number of context vectors. In one embodiment, a dimensionality of 280 was found to be too large, and a 16-dimensional context vector space was chosen and found to provide a significant improvement for a delinquent debt predictive model.

A transformation matrix M then is constructed, in which every row contains the components of one eigenvector. The transformation matrix will be therefore of dimension d*S.

Document vectors are constructed 418. For each individual document $d_1, d_2, \ldots d_m$, a unit word occurrence vector $w_i$ (i=1, 2, ... S), with dimensions S*1 is constructed.

Each unit word occurrence vector $w_i$ is transformed using the transformation matrix M to obtain a d-dimensional document vector $v_i$:

$$M * w_i = v_i \quad (1)$$

The document vectors $v_i$ are then clustered to compute 420 a set of N cluster centroid vectors $C_i$. Each cluster centroid vector $C_i$ points to the center of a cluster containing documents of similar contextual information. In one embodiment, each cluster has an associated list of keywords. Keywords are computed by finding those words in the "good words" list that have the highest dot product with the cluster centroid vector. A frequency filter is then applied to the list of keywords such that only those words that appear most frequently are included in the final keyword table. An example of a keyword table is given in Table 4:

TABLE 4

Example of Context Vector Cluster Keywords

| Cluster | Keywords |
|---|---|
| 1 | ADJUST CONTRACT ACTION STOPPED ENCLOSED |
| 2 | VACATION ADVISED REMIND PERSONAL S |
| 3 | FRM SEARCH COASTAL UNABLE CERTIFIED |
| 4 | PROOF VISA WRONG ATTENTION MOTOR |
| 5 | LETTER PHYSICAL SOUNDED CONSTRUCTION DEATH |
| 6 | MONTHLY SETTLEMENT OVERNIGHT TRANSFER COLLECTION |
| 7 | JAIL SECRETARY OFFICE JUDGMENT PERMISSION |
| 8 | THINKS ASSIGNMENT CO ACCT INTEND |
| 9 | RESEND FIGURE DEATH LITTLE RAISE |
| 10 | TAKING BUSINESS PERMISSION ACCT CHARTER |
| 11 | REDATED SOCIAL MONTHLY BALANCE SALARY |
| 12 | MANUAL VEHICLE PURSUE MENTIONED READ |
| 13 | DECIDED ASKD REFUSED VACATION EXPRESS |
| 15 | FORECLOSURE JOB UPDATE RESPONSIBLE ENVELOPE |
| 16 | JUDGMENT WEEKEND JAIL PERSON MISSED |
| 17 | WRONG STAMPED DIVISION CLOSE SIG |
| 18 | AGAINST SICK OFFER CLEARED SURGERY |
| 19 | PERMISSION NOTES AGREED EQUITABLE SEARS |
| 20 | SENT ASAP FEDERAL UNDERSTAND LIVE |
| 21 | OTHER |

The set of keywords for each cluster provides contextual meaning for the cluster. For example, cluster 18 appears to deal with illness, cluster 7 appears to deal with criminal and legal issues, cluster 6 appears to deal with payment plans and settlements, and cluster 15 with foreclosure and job issues. Keywords such as "jail" appear in more than one cluster, which indicates that this word is an important component of several clusters.

The context vector model is now used to create additional informational inputs for a particular delinquent debt account for use in a predictive model. A document is constructed 430 from the collectors' notes for a current delinquent debt account. The document is subjected to the data cleansing process 432. A document vector is constructed 434 by constructing a unit word occurrence vector $w_i$ and using the transformation matrix M to obtain a d-dimensional document vector $v_i$.

Each document vector $v_i$ is then projected 422 onto each cluster centroid vector $C_i$ to determine which clusters each document most resembles. A vector dot product is performed between the document $v_i$ and the N cluster centroid vectors $C_i$ resulting in N dot products $a_i$:

$$v_i \cdot C_i = a_i \quad (2)$$

The N dot products $a_i$ define how close each document is to each cluster vector, and these dot products are used as inputs into the predictive model. As each cluster contains documents of similar context, the dot product of a document vector $v_i$ with each of the N cluster vectors $C_i$ quantifies the cluster vector that the document most resembles. A dot product close to 1.0 quantifies that the document contains very similar contextual information to the cluster vector, whereas a dot product close to 0.0 represents nearly no shared information. These projections are used as inputs 438 into the predictive model.

In another embodiment, the d components of the document context vector $v_i$ expressed in the context vector eigenbasis (i.e., the projections along the subspace defining each context vector) may be used as inputs into the predictive model. This embodiment does not use cluster centroid grouping of document vectors.

An important consideration in modeling with context vectors is how to build the document vectors. A document vector can be constructed in two ways. In one embodiment, past documents are merged into one document by accumulating historical information on the cardholder (like a story). This approach relies on the idea that several comments blended together can form a good contextual profile of the cardholder. In another embodiment, a vector computation is performed for each separate comment. This fine-grain approach is most useful for identifying actions like a promise to pay, debtor not home, broken promise, working, or death in family, but the "whole story" may be missed. To obtain historical information, the single-comment vectors can be added or decayed in an appropriate fashion to obtain a historical averaging (not the same as a story) of the past comments. Historical averaging has some inherent shortcomings. For example, decaying the cluster vector dot products makes distant pieces of information less important. However, events like broken promises to pay are very important in the modeling effort, irrespective of how far in the past they occurred. In a third embodiment that combines these two approaches, single comment context vectors are used to identify single events, whereas blended documents are used to derive a customer contextual profile.

The example shown in FIG. 4 and described above presents one embodiment of a method for creating a mathematical representation of textual information. Additional embodiments of the construction and use of vectors to represent text are given in U.S. Pat. No. 5,619,709; U.S. patent application Ser. No. 08/971,091; and U.S. patent application Ser. No. 09/306,237, the subject matter of each of which is herein incorporated by reference in its entirety.

4. Predictive Model Applications a) Net Present Value Over Lifecycle of Debt

After the delinquent debt collection predictive model has been trained on a set of historical debt collection records, the model may be used to make decisions about how to collect existing delinquent debts. A variety of different types of decisions may be considered. For example, the model may be used to determine the estimated value of a delinquent debt account, the optimal collection actions to use with a particular account, or the appropriate collections specialist to attempt to collect on the account.

Typically, an estimated value is developed for a delinquent debt account by using the predictive model to estimate a probability that the debt holder will pay, multiplied with the face value of the debt. For example, a delinquent debt of $100.00 where the debtor has a 5% probability of paying generates an estimated debt value of $5.00. Thus, when comparing the use of two different debt collection actions on a particular account, the estimated value of the account given one action is compared to the estimated value given another action. The action that generates the higher estimated value is the preferred action to take on the account.

However, there are additional factors that may also be taken into account when calculating the estimated value of a delinquent debt account. For example, different actions have different costs (i.e., a phone call is more expensive than a letter). Also, the timing of collecting the debt is also important due to the time value of money (i.e., collecting today is better than collecting in 2 years). A predictive model trained with the same data and inputs may be used to predict multiple outcome variables for use in calculating the value of a delinquent debt, by changing the target outcome variable of the predictive model. For example, one outcome target value may be "likelihood of collection," while another is "time to collection."

The following presents an example of the type of delinquent debt value calculation that is performed using the outcome of a predictive model or set of models. Assume a delinquent debt of $10,000 where the debtor is predicted to have a 5% probability of paying the debt (i.e., the likelihood of collection is 5%), the anticipated collection expense is predicted to be $100 in each of the next 2 months, the predicted time until payment is 2 months, and the effective time value of money factor (effective interest rate) is 1% per month. The following calculations are performed:

The expected collection amount is $500 (5%*$10,000).

The net present value (NPV) of the collected amount is approximately $490 ($500 discounted by 1% per month for 2 months.).

The expected collection cost is $200 ($100 in each of the next 2 months).

The NPV of the collection cost is approximately $197 as follows:

The next month's $100 expense is discounted by 1% to become $99

The following month's $100 expense is discounted 2%–1% per month for 2 months—to become $98. A more detailed calculation would also involve compounding interest for the 2 months.

Therefore, the NPV of the debt is $293 ($490–$197).

As an additional consideration, certain types of debt collection actions may also involve customer relations or legal concerns due to the nature of debt collection. The overall value of a delinquent debt account is given by:

$$\text{Value} = \frac{\text{Recoveries} - \text{Cost\_of\_recovering}}{(1 + \text{Discount\_Rate})^n} \quad (3)$$

In equation 3, Recoveries is the amount of the delinquent debt that is eventually paid. Cost_of_recovering represents the cost of all of the collection actions taken on the account, which is typically derived from models and historical information about debt recovery. The Discount_Rate represents the time value of money factor (the interest rate per period), where n represents the amount of time that passes before the debt recovery is made (number of periods). The general method of equation 3 for estimating the value of a debt is expanded upon for different stages in the lifecycle of a delinquent debt in the following discussion.

The various methods used to collect on a debt may vary depending upon the type of debt and the current stage of delinquency. For example, when a company holds a delinquent debt where the debt holder is a repeat player in the debt market (such as a credit card company), the company may initially wish to avoid needlessly irritating the debt holder during collection efforts. However, later in the delinquent debt lifecycle, the same credit card company may already have closed the customer's account, and is thus no longer concerned about losing the debt holder as a customer. In other situations, such as a mortgage debt, the mortgage company may not be particularly concerned with losing the customer, but instead must determine when it is appropriate to seize the underlying collateral on the debt.

Figure 5:
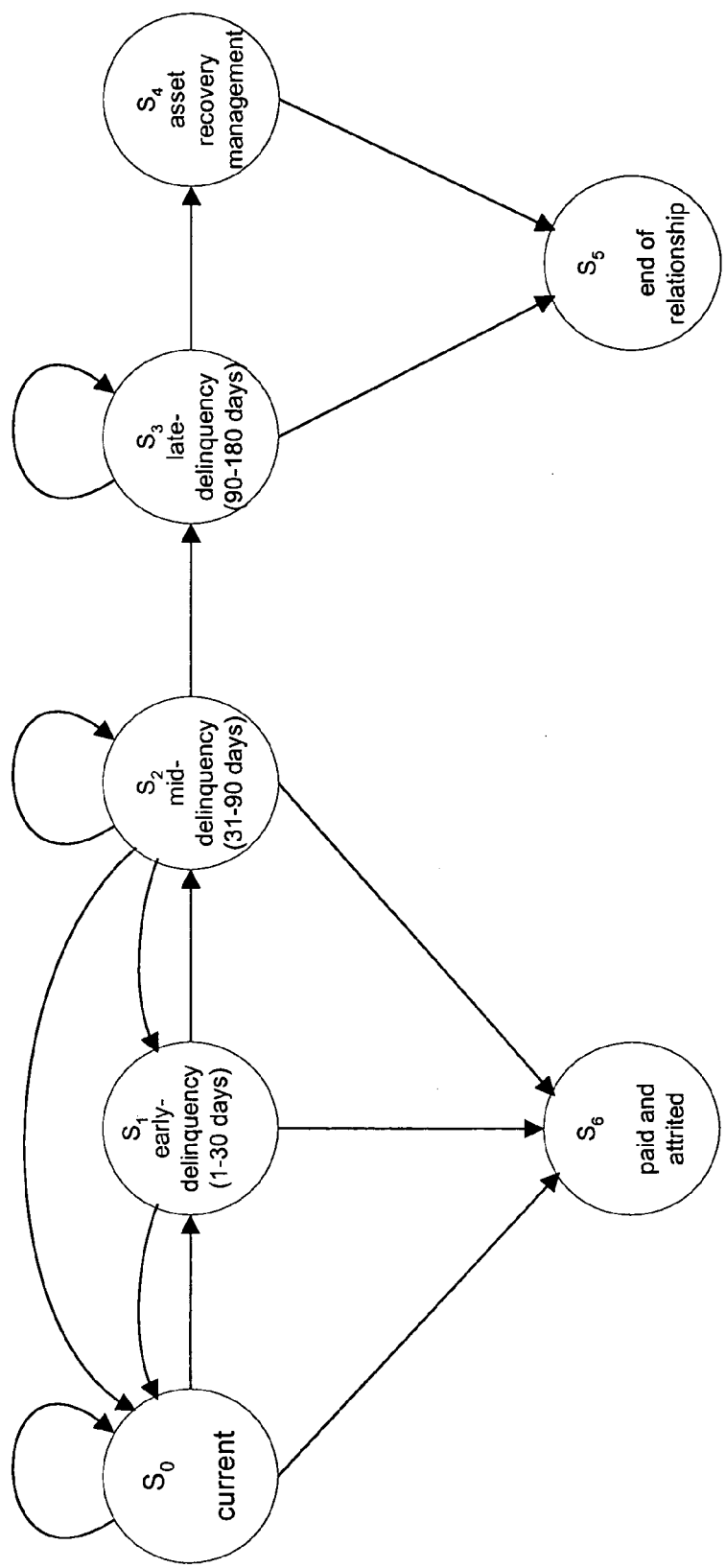
FIG. 5 is a diagram of the life cycle of a delinquent debt account in an embodiment of the present invention.

Different factors involved in calculating the estimated value of a delinquent debt account come into play in different stages of the lifecycle of a delinquent debt. In the example of FIG. 5, a credit card debt lifecycle is shown. However, it will be evident to one of skill in the art that the debt lifecycle analysis is equally applicable to other types of debt.

FIG. 5 is a diagram of the lifecycle of a delinquent credit card debt account. Each state in the diagram should be understood as a stage in the current or delinquent life of a credit cardholder account. State $S_0$ represents the current or non-delinquency stage, and states $S_5$ and $S_6$ are terminal states in which the account is no longer on file, whether voluntarily through attrition (wherein the account holder terminates his relationship with the issuer after paying all debts) or involuntarily due to the issuer ending its relationship with the customer. The delinquency states $S_1$, $S_2$ and $S_3$ represent early-, mid- and late-delinquency stages. The separation between early-, mid- and late-delinquency is based on significant delinquency events. For example, in early-delinquency the cardholder may have his account authorizations turned off, in mid-delinquency the cardholder's account may be closed, and in late-delinquency the cardholder cannot become current anymore. The day ranges for early-, mid- and late-delinquency should be interpreted as days past due (i.e., the number of days past the statement payment due date). It will be understood by one of skill in the art that the day ranges given are only approximate. A wide variety of timing ranges for the different delinquency states are possible.

As mentioned above, the states are segmented based on distinct actions at each stage and the possible transitions between states. Each transition from one state to another is assumed to only take place once per cycle (e.g., every 30 days). The different states and available transitions are briefly explained as follows.

In state $S_0$ an account is current, meaning that the last payment was received on time. At the next statement due-date, the account can either remain current (the self-loop from state $S_0$) or become 1–30 days delinquent (transition to state $S_1$). In state $S_1$, the account has entered early-delinquency. Many of these accounts will self-cure (i.e. pay the debt due) or cure with collection specialist intervention (both of which are represented by the transition from $S_1$ to $S_0$). However, a significant number of accounts will move to a later stage of delinquency (transition to state $S_2$). Some of the accounts that move to state $S_2$ are straight rollers, meaning that irrespective of the actions taken by collectors, they will end up by being finally charged-off. An account can only be in the $S_1$ state for a single statement cycle, there is no self-loop in state $S_1$. Typically, between 15 and 30 days past due most accounts will be shut-off to authorizations.

In state $S_2$ the account is in mid-delinquency. The account can remain in this state when the new statement arrives (self-loop from state $S_2$), can become current by making, for example, 2–3 minimum payments (transition from $S_2$ to $S_0$) or be re-aged by making a minimum payment (transition from $S_2$ to $S_1$). Finally, the account can move forward along the delinquency path, becoming late-delinquent (transition from $S_2$ to $S_3$).

The transition into state $S_3$ is characterized by the fact that at approximately 90 days past due the cardholder's account will be closed, meaning that most cardholder accounts will not be re-opened for transactions (the exceptional cases of reopening past 90 days past due are not taken into consideration in the diagram). Therefore, there is no transition from this state to states $S_2$, $S_1$, or $S_0$. The account will typically be terminated, irrespective of whether the debt is paid or not. If the account holder pays his/her debt, the account will go to $S_5$. Otherwise, if the bank wants to continue to try to collect what is owed, the account will go to the asset recovery state $S_4$.

In state $S_4$ the account is off the collections books (legally a debt must be written off after it is 180 days past due) and the account is worked by the asset recovery management group. Actions available to this group include arranging payment plans, taking legal actions, accepting some fraction of the owed amount, or selling the account to an external collection agency. In state $S_5$ the account is taken off of the debt issuer's books and the account holder's relationship with the debt issuer is terminated.

State $S_6$ represents an attrition state, where too harsh collection efforts have caused the cardholder to pay-off his debt in full and voluntarily end the relationship with the debt issuer. Attrition state $S_6$ may occur after states $S_0$, $S_1$ or $S_2$. The different actions available in each state, as well as the models intended to address the different collection needs, are presented below.

Accounts in state $S_1$ (early-delinquency) have just become delinquent and a substantial portion of them will cure out of delinquency and become current without any action being taken by collectors. Typically, a statement message is sent to everyone at the next statement date (about 5 days into early-delinquency) and does not incur any additional cost to the issuing bank. Reminder letters may also be sent to accounts starting around 10 days into early-delinquency, incurring a cost of approximately 30 cents per letter. Finally, collectors may attempt to contact the 15–20% of the riskiest accounts by phone with each successful phone contact representing approximately a $15 cost to the issuing bank. Pursuing every account in this early-delinquency segment with collection activity may waste valuable resources since many accounts self-cure. Additionally, the issuing bank risks jeopardizing a number of profitable cardholder relationships (cardholders annoyed by the collection activity may decide to attrite—transition to state $S_6$). The most significant action taken by collectors in $S_1$ is typically to block authorizations for the account at 10–15 days into early-delinquency.

Accounts that enter early-delinquency can be classified as "self-cure," "straight rollers" and "cure-with-action." As the names suggest, self-cure accounts become current (i.e. pay the debt) irrespective of whether the bank takes any collection action or not (most often these accounts are those whose statements were either lost in the mail or who were traveling, therefore unable to pay their bill on time). Straight-rollers are those accounts that undergo the entire delinquency cycle ($S_1$-$S_2$-$S_3$-$S_4$-$S_5$) irrespective of any collection action taken. The accounts that are of major interest for focusing the collection effort are those accounts that will only cure with intervention.

Given the previous considerations, two predictive model estimates may be used: one that estimates the probability that the account cures with intervention and another that estimates the probability that the account cures without intervention, respectively. At a finer granularity, distinct estimates are made for each of the different possible actions taken, such as the probability to cure with a reminder letter sent, the probability to cure with successful phone call made, etc. The result from taking "no action" is estimated as simply a type of action.

It should be noted that in early delinquency "cure," "become current" and "pay minimum payment due" are synonymous. Therefore, in order to introduce a consistent terminology across the different delinquency stages, the probability to pay (given an action or without action) is used as the measure for collection efficiency. Additionally, the probability to pay should be understood as the probability to pay the minimum due during the current delinquency stage and not across possible future delinquency stages.

The value of an account can therefore be expressed as:

$$\text{Value}(\text{account}|\text{action}_i) = P(\text{pay}|\text{action}_i) * [ADJBAL + (1 - P_a(\text{action}_i)) * \alpha * NPV] - \text{COST}(\text{action}_i) \quad (4)$$

Here P(pay|action) is the probability of paying given a certain action, ADJBAL is the adjusted balance on the account through the delinquency stages, NPV is the net present value of the account, and $P_a$ is the probability of attrition given a certain action (when $\text{action}_i$ stands for "no action," the attrition probability due to the action will be zero). Generally, the action that provides the largest account value will dictate the preferred action. However, in order to allow the selection of a sub-optimal action due to "preferred customer" or other business considerations, we can determine the selection of a preferred action based on the incremental benefit $\Delta(i, j)$ of an action ($\text{action}_i$) versus an alternate action ($\text{action}_j$).

$$\Delta(i,j) = \text{Value}(\text{account}|\text{action}_i) - \text{Value}(\text{account}|\text{action}_j) \quad (5)$$

The above adjusted balance (ADJBAL) is given as a recursive formula that takes into account interest and late fees:

$$ADJBAL_0 = \text{Balance} \quad (6)$$

$$ADJBAL_{t+1} = (1 + \text{Interest}_t) * (ADJBAL_t - \text{Payment}_t + \text{Charges}_t) + \delta(t\%30) - 1) * \text{Late Fee}_t \quad (7)$$

The first term of equation 7 accounts for the balance increase due to interest applied to the account, whereas the second term accounts for the late fees that are applied at every statement date. Payments made and additional charges to the credit card account since the last balance adjustment are also taken into consideration. In order to allow for a variable interest/late fee structure, indices have been added to the former two quantities. In equation 7, t represents the number of days since the missed due date. $\delta$ represents Kronecker-Capelli's delta which is 1 only when its argument is zero and 0 otherwise, (t % 30) stands for the remainder of the integer division of t by 30, which is 1 only every thirty days. Equation 7 represents late fees being assessed every 30 days, but the equation may be modified to adopt to situations where late charges are assessed monthly.

Finally, the net present value (NPV) in equation 4 represents the bank's long-term gain due to the credit cardholder. Thus the NPV of equation 4 refers to the value of an account, once it is in good standing again, to the issuer. This is the value that the issuer will lose if the account holder decides to attrite. At this stage, it is assumed that the NPV is computed according to the issuer's specification, possibly weighted by a scaling constant cc. Alternatively, $\alpha$ can be viewed as an operator (e.g., differentiation) used to allow an issuer using this model to modify the value-of-an-account computation to better represent their specific customer worth beyond a standard NPV calculation. For example, if a portfolio is being readied for sale at a multiple above the total NPV of the constituent accounts, then it would be reasonable to use $\alpha$ to represent that multiple. For a straight NPV maximization evaluation, $\alpha$ is set to 1.

Once the most desirable action for each account is chosen and the associated account value computed, the accounts can consequently be ranked by incremental benefit $\Delta(i, j)$. This incremental benefit ranking determines queues to be worked by collection specialists.

Once an account reaches mid-delinquency, the probability of self-cure without action is nearly zero. Therefore, to collect dollars on an account generally requires the allocation of collection resources in some fashion. However, it is undesirable to act at all on straight rollers because the actions will not produce a cure. Typical actions taken at this stage are letters and phone calls. Although phone calls are significantly more expensive then letters, they also tend to be more effective, and are thus preferred. Federal and State Fair Debt Collection Practices, preventing collectors from calling before/after certain hours and not allowing more than pre-specified numbers of contacts, regulate phone calls. Consequently, typically after a successful contact (in which a promise to pay was made), a collection specialist will not contact the credit card debt holder again until the payment promise has been broken. Here, a record of prior collection efforts (past delinquencies) and current collection communication becomes important in establishing the validity of promises. Data feeds such as past delinquency, promises kept/broken, and number of times contacted, are important in predicting the amount of collected dollars. Since a successful contact translates into an increased probability of collection, it is extremely important to attempt to contact the credit cardholder when one is most likely to find them at home.

Two predictive models may be used at this delinquency stage, a model predicting the best time to call a cardholder and a model estimating the probability to pay. Once again, the probability to pay can be conditioned upon the action taken on the account.

A probability to pay model incorporates historical information such as past delinquencies, broken promises, authorizations, credit limit, behavior scores, etc. A best-time-to-call predictive model has, as an output, whether successful telephone contact is made with the correct party, and as input various information about the delinquent debt account, as well as call-attempt-specific information such as the time and the date of the call attempt. The best time to call prediction will utilize information about past successful/failed contacts, but must be tempered by the fact that there is a limited "collector bandwidth" (i.e., only a limited number of accounts can be contacted within a certain time frame). The collector bandwidth is a parameter that is determined by the operational situation of the collection organization. It may be dependent on the number of employees, the length of calls, and other site-specific parameters. These site-specific parameters are supplied as fixed parameters in the best time to call decision making process. It may not always be possible for a collection organization to call each account at the precise time suggested by the best time to call predictive model, as this may be inconsistent with the organization's available operational loads and legal restrictions.

Equation 4 also applies to the mid-delinquency stage. However, the probability to pay will obviously take on a lower value at this stage than during the 1–30 days period, due to the increased probability of charge off at the later stages of delinquency. The account's value (left hand side of equation 4) is a metric that serves to order the accounts in allocating collection resources throughout the different stages of delinquency.

During the mid-delinquency stage, a collection specialist has several important actions available, which directly affect the credit card holder. One action is shutting off any authorizations that have remained open through the early stage of delinquency. A further action is the closing of the credit card account. Both shutting off authorizations and closing the account serve as valuable bargaining chips for collection specialists in affecting the payment of delinquent debt. These actions are clearly identified by the predictive model as a specific type of letter or phone call that may be made, for example "letter threatening account closure" is one specific action. In addition, in order to measure the efficiency of these actions, it is important to identify in the model how they were presented to the credit card debt holder (e.g., as verbal or written threats of actions taken on their account). At the end of state $S_2$, the account has been closed and there is no chance for the cardholder to come into good standing with the bank.

The last stage $S_3$ of pre-charge off collections is often the most difficult to manage as there will typically be no future continuing relationship with the cardholder. The accounts in this state generally have very high forward-roll rates to charge off, coupled with very low contact rates. Because data sources such as transaction, payment, master file and credit bureau data become stale at this stage, information obtained during the collection process itself becomes very important.

At this stage, the only incentive for the credit card debt holder to pay is to repair his/her credit record and subsequently end the relationship with the bank. Early-out policies are possible in this stage, in which by agreeing to pay part of the outstanding balance the account is removed from the accounting system, tagged as "paid in full," and is legally "off the bank's books." Since this stage is characterized by very low contact rates, a model estimating a probability to pay given a certain action is helpful in prioritizing contact efforts. A best-time-to-call model may still be appropriate at this stage if the historical information of past contacts is not stale or overly sparse. Generally, collectors work to contact those accounts identified as most probable to pay, and will make as many contact attempts as possible. Predictive models that estimate the probability to pay given different actions are the most feasible models at this stage of delinquency. These models utilize data sources such as collectors' notes to determine which accounts have made promises, how easily the account has been contacted, and the credit card debt holder's responses to collection efforts. The predicted value of the account given a certain action is given by:

$$\text{Value}(\text{account}|\text{action}_k) = P(\text{pay}|\text{action}_k) * ADJBAL - \text{COST}(\text{action}_k) \quad (8)$$

Considering that the charge off rates are typically significantly higher as the account progresses along the delinquency path, the probability to pay is therefore lower in late-delinquency as compared to mid-delinquency (which, in turn, is lower than the one in early delinquency).

Most often, at 180 days past due, accounts are taken off the collections accounting system. Accounts will either have ended their obligation to the bank (ending in state $S_5$), or will have been passed onto the asset recovery management (state $S_4$).

The objective of state $S_4$ asset recovery management is to maximize the amount of post charge off recovered dollars by choosing the best recovery channel (in-house recovery, a legal department, or an external collection agency). A relevant factor at this stage is the freshness of contact information and the success of the collection team in collecting some percentage of the owed dollars. For accounts where contact information is missing, or collection specialists have found the credit card debt holder unwilling or unable to make any payments, the accounts can be bundled and sold to secondary collection agencies. For accounts that are found to have the means to pay, legal actions may be taken. For accounts in which the predicted percentage of recovered dollars is larger than the liquidation value that can be received from secondary debt purchasers, a cost-benefit formula can determine which accounts will remain in-house. An account's value is expressed as an expected collected amount over a given time period as a percentage of its outstanding balance.

Collectors' notes can potentially be extremely informative at this stage, because recovery management is typically totally separate from the collection process. In addition to the raw collectors' notes, additional pre-charge off aggregated data streams may also be generated and used such as the number of broken promises, payment information, recent successful contacts, and the date of the last successful contact.

At the recovery stage (after a debt has been legally charged-off), there are various available "channels" for continued collection efforts. Different collection channels include, for example, legal actions, an asset sale (selling the debt—typically at pennies-on-the-dollar—to another entity, who may specialize in recoveries), a collection agency, or continued in-house efforts. The expected recovered dollars for training the predictive models may combine recoveries with portfolio-specific economic parameters of the collection channel such as placement fees, internal recovery costs, data processing expenses, cash flow, etc. Each channel has associated costs and an associated chance of salvaging some of the debt value.

The recovery model is used to help identify the best channel for each specific charged-off account. The output variable for this model is the total recoveries minus the total cost of the collection effort (with both quantities corrected for the time-value-of-money as explained previously). In one embodiment, a different predictive model is built for each different collection channel. Alternatively, a single predictive model may be used with the channel being an input parameter. For some channels, a statistical model may not be necessary (for example, if an asset sale always brings a fixed pennies-on-the-dollar ratio; then it can be calculated directly with no need to use a statistical model).

b) Collection Action Modeling

Modeling the success or failure of a particular collection action is complicated due to the fact that by making action recommendations, the underlying distribution on which the model was built is changed (i.e. a feedback loop is created, because each current action taken effects the likelihood of the consequences of future actions). In order to explicitly model collection action effects to obtain better recoveries, it is preferable to avoid creating too many distinct actions to be monitored, to prevent undesired feedback. Assume, therefore, that all possible actions have been aggregated into a small number of action groups (e.g., soft reminder letter, harsh reminder letter, soft reminder call, harsh reminder call, threat to shut off authorizations, threat to close account, offer of partial pay, offer to re-age, etc.), denoted as $a_1, a_2, \ldots,$ $a_q$. Furthermore, assume that building individual predictive models that estimate the probability to pay for each action or action sequence is practically undesirable. Two different embodiments of the modeling process may be used, either modeling the effect of a single action, or modeling the effect of action sequences.

In one embodiment modeling the effect of a single action (current action), all of the possible action groups are encoded ($a_1, \ldots, a_q$) by performing a 1-of-q encoding and adding the q additional variables to the existing predictive model inputs. In a 1-of-q encoding, q variables are used as inputs, representing all possible actions groups of interest. Whenever an action takes place, only one of these q inputs will have a value 1 (corresponding to the action group that the current action belongs to), whereas the remaining q-1 inputs will be 0. The prediction target will be different than the targets mentioned for early-, mid- and late-delinquency (marginal and conditional probabilities to pay) and will quantify the effect of the action over a finite time interval (e.g., recovered amount over a six months period as a percentage of the outstanding balance).

However, in collections it can be difficult to quantify the effect of any one action. Typically, several actions have occurred before one is presented with the result. As an example, a reminder letter may trigger a decision to pay, but a harsh call may be made in the meantime and it is interpreted that the harsh call caused the payment. Alternatively, oftentimes an early action encourages payment, but the cardholder must wait for a paycheck to pay the amount owed. Therefore, modeling single actions can be spurious, as the cause and effect of an action are not always easily identifiable.

The difference between modeling a single action as opposed to modeling action sequences relies on how to treat action sequences as complex single actions. In another embodiment modeling the effect of an action sequence, assume (for practical manageability) a fixed window w of past actions that is considered at any time when evaluating the actions' combined effect. For example, assume that the pool of single actions contains 5 possible actions (where q represents the number of possible action groups,) $a_1, a_2, \ldots, a_5$. Furthermore, consider a fixed window containing the last 3 actions. Consequently, the following action sequences are denoted as complex single actions:

$a_1, a_2, a_3 \rightarrow c_1$ $a_1, a_5, a_2 \rightarrow c_2$ $a_3, a_2, a_1 \rightarrow c_3$ . . . (continuing the set of complex actions) (8)

In the context of this example, the total number of unique complex actions is:

$$\frac{q!}{(q-w)!} = \frac{5!}{(5-3)!} = 60 \qquad (9)$$

If all complex actions are encoded in a similar fashion as simple actions for providing predictive model inputs, this results in a fairly large number of additional inputs (60 in this example). However, if it is known that from the entire pool of possible action sequences only a small number of sequences are actually possible in practice, only those possible sequences are converted to complex actions, and a 1-of-n encoding is performed only for those n complex actions.

Alternatively, in yet another embodiment, the predictive model may be provided with the set of all possible single actions, without using a 1-of-n encoding. Each input line is 0 if the action has not occurred in the lifetime of the account, or 1 if the action has occurred while the account has been in collections. Therefore, the predictive model is provided with all the actions that occurred in the history of the account without allowing the inference of the action sequence. The sequence in which the actions occurred may not be necessary for the model, because it is often the case in collections that actions occur around fairly rigid timelines, and thus any appearance of an action is identifiable within the action sequence. For example, a threat to shut off authorizations is typically done only after a statement message and a reminder message have already been sent. In this situation if an unknown complex action occurs, that complex action will translate to the entire n predictive model inputs as having a 0 value ("inactive").

Unknown action sequences may pose a problem on estimating the conditional probability to pay. Under these circumstances, instead of using the predictive model output value as an expected probability to pay given some unknown action, a prior probability of payment may be computed over the entire population irrespective of the action taken. This prior probability evolves towards a posterior probability as more and more data reflecting the result of the new action is gathered.

In practice, a certain complex action may be taken rarely (or not at all) on a particular segment of the population. Therefore, for this population segment it is undesirable to trust the predictive model estimate of the probability to pay given the rarely applied complex action. Consequently, it is preferable to compute a prior probability that is adjusted, as more data regarding the success of the sparsely occurring complex action becomes available. Since the population segments for which to monitor the presence or absence of a certain complex action are typically unknown a priori, a means for performing an implicit segmentation on which to monitor the scarcity of different complex actions is needed. An implicit segmentation is achieved by constructing statistical estimates of the marginal probabilities of taking different complex actions. These estimates may be constructed by training a multiple-output predictive model that provides on each output the marginal probability of a given complex action being applied to the delinquent account.

Figure 6:
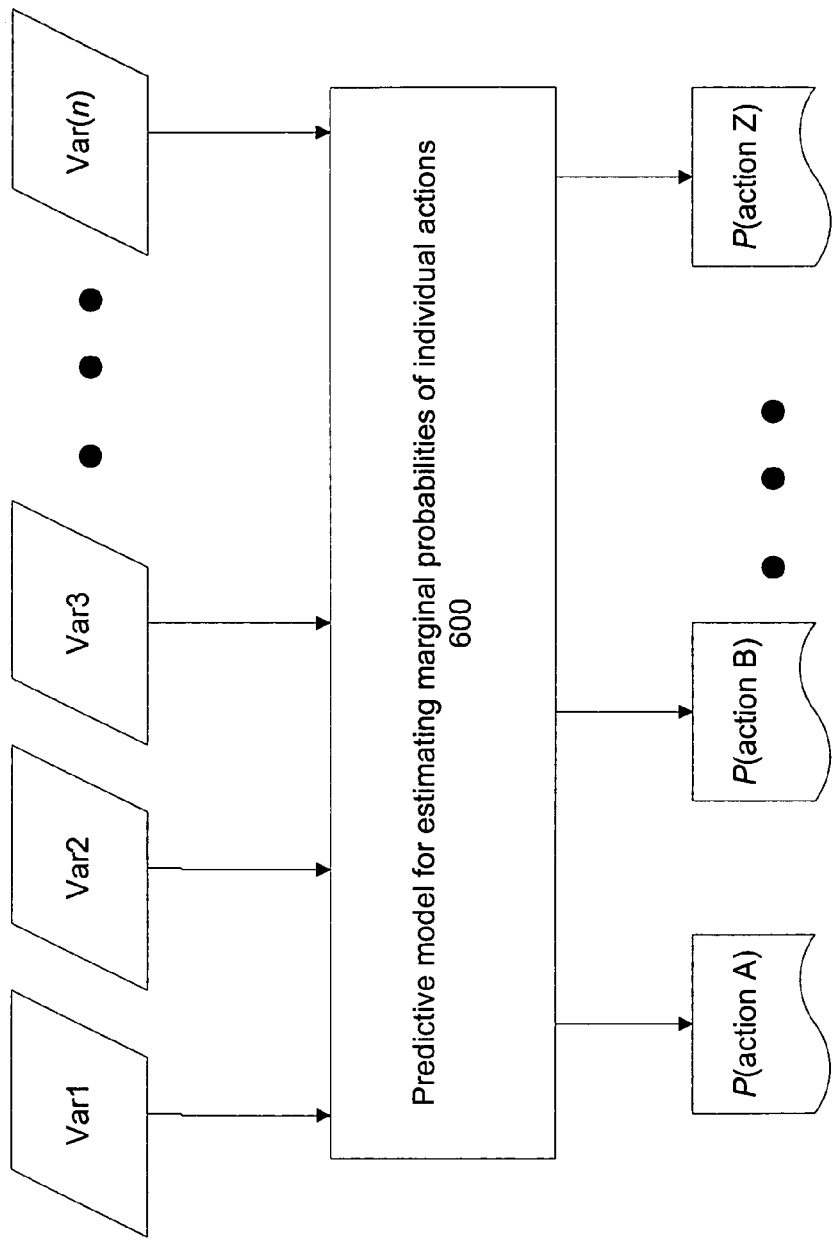
FIG. 6 illustrates a predictive model for estimating marginal probabilities of individual actions in an embodiment of the present invention.

FIG. 6 illustrates a multiple-output predictive model 600 that has a set of n input variables (Var1–Var(n)) representing a set of n possible single actions. The predictive model 600 provides as output the marginal probability P of a given complex action (actions A–Z) being applied to the delinquent account. Since actions A, B, . . . , Z represent an exhaustive enumeration (i.e., partitioning) of all the possible complex actions to be taken, a constrained optimization is performed to ensure that the provided probabilities are normalized (sum up to 1). This normalization may be avoided by constructing individual predictive models to estimate the marginal probability for each individual complex action. An implicit segmentation is imposed by setting a low threshold for each marginal probability (e.g., R could be defined as representing the segment of the population for which P(action A) is less than a specified threshold $T_A$).

By scoring the entire population, the desired segmentation is obtained. The probability to pay given a complex action is computed either by using the predictive model estimate or by using the previously discussed prior probability. The prior probability for a population segment is computed as the probability to pay given all possible actions whose marginal probabilities exceed the corresponding thresholds $T_I$, $T_J$, ..., $T_K$. As sufficient data is gathered for sparse complex actions, the prior probability can be modified to reflect the success or failure of the complex action.

c) Global Optimization of Resources

In one embodiment, accounts in different delinquency states are treated and prioritized separately by the predictive model. The overall predictive model contains several separate models within it to be used for accounts in different delinquency states. In another embodiment, resources (for example, collectors) are globally optimized across the different delinquency stages in order to maximize the overall recovered amount. A common value measure is used across the different delinquency stages, such as the value(account) function introduced in each delinquency stage, given in equations 4–7. Care should be taken to ensure that the value-function is continuous across the delinquency stages and that none of the computed values within a delinquency stage is overly emphasized (possibly artificially). In this embodiment, the organization that issued the debt adapts a multistage delinquency treatment, instead of the typical bank model where collectors are assigned to specific delinquency stages (e.g., "customer service collectors" are assigned to early-delinquency, and more experienced collectors are assigned to later-delinquency). The value(account) metric prioritizes accounts within specific stages and may also be used to prioritize accounts across stages allowing collectors to work across delinquency stages. The previously introduced value(account) metric of equation 4 is used as a function allowing a cross-delinquency stage prioritization of accounts as follows.

It is assumed that for late-delinquency the probability of attrition is set to 1, irrespective of the action taken. In order to rank the accounts within or across delinquency stages, we can proceed as follows. First, a table (Table 5) is created in which each row is assigned an account number and each column represents a simple or complex action. Next, the value(account) function (equation 4) is used to compute each entry in the table:

TABLE 5

| Account | Action | | | |
|---|---|---|---|---|
| | A | B | C | D |
| 1 | 10 | 20 | 30 | 28 |
| 2 | 20 | 10 | 5 | 45 |
| 3 | 27 | 10 | 20 | 7 |
| 4 | 3 | 10 | 22 | 20 |

Next, the maximum value within each row is determined. This value indicates the desirable action and quantifies the maximum value of the account, as shown in Table 6:

TABLE 6

| Account | Action | | | |
|---|---|---|---|---|
| | A | B | C | D |
| 1 | | | 30 | |
| 2 | | | | 45 |
| 3 | 27 | | | |
| 4 | | | 22 | |

Next, the accounts are ranked based on the determined best account value, as shown in Table 7. Based on the rank ordering, the accounts and the suggested action to realize the account value can be assigned to one or more collector queues.

TABLE 7

| Account | Value | Action |
|---|---|---|
| 2 | 45 | D |
| 1 | 30 | C |
| 3 | 27 | A |
| 4 | 22 | C |

In cases in which the incremental benefit of different actions needs to be taken into consideration (for example if a harsh letter only results in a marginal return compared to a soft letter, then a soft letter may be preferable), the most desirable action and its associated value is computed by assigning value thresholds to pairs of actions. Resources are thus optimized globally across the group of accounts.

In one embodiment, individual optimized account-level value predictions are rolled-up at the portfolio level. Typically, late-delinquency accounts are sold as a group, or portfolio, to a secondary debt collection agency. The secondary collection agency will evaluate the expected collection return from the portfolio in order to determine a reasonable purchase price. Using a predictive model and the global optimization methods disclosed herein, a secondary collection agency can estimate the maximum expected collection rate on all of the accounts in a portfolio (assuming that properly optimized collection actions will be taken on each of the accounts). The secondary collection agency can also estimate the cost of the optimized collection actions that will be taken on the portfolio accounts. This produces a global value estimate for the entire portfolio, and aids in setting a proper price for the worth of the portfolio.

In another embodiment, results are globally aggregated across a portfolio of accounts, but different statistical predictive models are constructed and used for different segments of the portfolio of accounts. This embodiment allows additional individual tailoring of predictive models to represent a particular account type. Such a set of predictive models may more precisely predict collection results for their particular account segment, resulting in improved overall global predictions of collection results.

Delinquent debt accounts may be segmented in a variety of different ways. For example, as discussed previously, different debt lifecycle stages or time periods have different valuation methods, as well as different available collection actions. Debt in different lifecycle stages may be divided into segments, where each segment uses a different predictive model. Accounts may also be segmented based upon the credit-worthiness of the debtor, the type of debt, collection activity history, the amount owed, collection notes information, a debt's status as charged-off, or the number of collection agencies that have worked on the debt. Statistical clustering of similarly behaved accounts can also provide a mechanism for segmenting accounts.

d) Optimization of Selected Individual Collection Specialist

In yet another embodiment of the invention, a predictive model is used to select the most appropriate collection specialist to work a particular delinquent debt account. In one embodiment, a separate predictive model is created to predict the optimal collection specialist for an account. In another embodiment, a predictive model predicting the likelihood of collecting and thus the value of an account is used. In this embodiment, an individual account's value is calculated using each different collection specialist, and the maximum value indicates the optimal collection specialist.

Existing methods for ranking the success rate of individual collection specialists typically track only employee proficiency, i.e., the percentage of debt that is collected. However, employee proficiency does not take into account the types of debt worked on by the collection specialist. Thus, typical models will not recognize that collector A is particularly good at divorce cases, while collector B does well with low-face-value debts.

Two different embodiments are possible for training a predictive model to optimize the assignment of individual collection specialists to delinquent debt accounts. In one embodiment, a predictive model is built using specific collection specialists as an input into the model, thereby linking them with the past accounts that they have worked. The resulting model may be used to estimate the value of a delinquent debt account given its assignment to a specific collection specialist. The preferred collection specialist for an account is the collection specialist that maximizes the value of the account.

In another embodiment, individual collection specialists are represented by a profile or parameter list. For example, a parameter list for an individual collection specialist might include his/her age, years of experience, proficiency, hours worked, sex, and the company employing the specialist. The resulting predictive model may be used to recommend attributes for a preferred collection specialist given a particular delinquent debt account.

Although the invention has been described in considerable detail with reference to certain embodiments, other embodiments are possible. As will be understood by those of skill in the art, the invention may be embodied in other specific forms without departing from the essential characteristics thereof. For example, different types of predictive models, such as a neural net or a statistical regression, may be used for modeling delinquent debt collection. Additionally, the predictive model may use context vectors to improve delinquent debt predictions. Furthermore, collection actions may be modeled individually, or as collection action sequences. Accordingly, the present invention is intended to embrace all such alternatives, modifications and variations as fall within the spirit and scope of the appended claims and equivalents.

We claim:

1. A computer implemented method of predicting the likelihood of collecting on a delinquent debt on an account, the method comprising the computer implemented steps of:
   statistically generating a predictive model of debt collection likelihood using historical data of delinquent debt accounts, specific collection methods used in each debt account, and the success of the collection methods used in each said debt account;
   storing said predictive model;
   generating a collector's notes model using said historical data of delinquent debt accounts;
   storing said statistically generated collectors' notes model, said statistically generated collectors' notes model representing different types of collectors' notes' subject matter as context vectors;
      wherein said different types of collectors' notes' subject matter comprises information to determine prior actions taken on said account;
   receiving data of a currently delinquent debt account;
   transforming collectors' notes of said currently delinquent debt account into a document context vector and performing any of:
      comparing said document context vector against context vectors of said collectors' notes model, determining a subject matter similarities result based on the comparison, and using said result as input into said predictive model; and
      using components of said document context vector expressed in context vector eigenbasis as input into said predictive model;
   selecting a collection method; and
   generating a signal indicative of the likelihood of collecting on the currently delinquent debt by applying the data of the currently delinquent debt account and the selected collection method to the predictive model;
   prioritizing collection resource expenditures by using said signal indicative of the likelihood of collecting on the currently delinquent debt.

2. The method of claim 1, wherein the delinquent debt was incurred on a credit card.

3. The method of claim 1, wherein the delinquent debt was incurred on a medical service.

4. The method of claim 1, wherein the delinquent debt was incurred on a utility bill.

5. The method of claim 1, wherein the delinquent debt was incurred on an unpaid check.

6. The method of claim 1, wherein the delinquent debt was incurred on mail-ordered goods.

7. The method of claim 1, wherein the delinquent debt was incurred on an electronic transaction via the Internet.

8. The method of claim 1, wherein the delinquent debt has been charged-off.

9. The method of claim 1, wherein the collection methods include a set of different letters that can be sent to delinquent debtors.

10. The method of claim 1, wherein the collection methods include different times at which a letter can be sent to delinquent debtors.

11. The method of claim 1, wherein the collection methods include different phone call approaches.

12. The method of claim 1, wherein the collection methods include different debt lifecycle stages when phone calls may be made.

13. The method of claim 1, wherein the collection methods include different debt lifecycle stages at which a letter can be sent to delinquent debtors.

14. The method of claim 1, wherein the collection methods include different days of the week during which phone calls may be made.

15. The method of claim 1, wherein the collection methods include different monthly dates during which phone calls may be made.

16. The method of claim 1, wherein the collection methods include different hours of the day during which phone calls may be made.

17. The method of claim 1, wherein the collection methods include different collections specialists who may be assigned to work the account.

18. The method of claim 1, wherein the collection methods include electronic communications that may be made with the debtor.

19. The method of claim 1, wherein the collection methods include offering debt counseling.

20. The method of claim 1, wherein the collection methods include debt rescheduling.

21. The method of claim 1, wherein the collection methods include offering additional credit.

22. The method of claim 1, wherein the collection methods include changing delinquency financial penalties for an account.

23. The method of claim 1, wherein the collection methods include offering debt forgiveness.

24. The method of claim 1, wherein the collection methods include a search for a missing debtor.

25. The method of claim 1, wherein the collection methods include legal actions.

26. The method of claim 1, wherein the collection methods include the employment of a collection agency.

27. The method of claim 1, wherein the collection methods include the sale of a debt.

28. The method of claim 1, wherein the historical data includes information regarding an account before the account became delinquent.

29. The method of claim 1, wherein the historical data includes account purchase information.

30. The method of claim 1, wherein the historical data includes information regarding the Merchant Category Code of purchases on the account.

31. The method of claim 1, wherein the historical data includes information regarding the amount of account purchases.

32. The method of claim 1, wherein the historical data includes information regarding account cash transactions.

33. The method of claim 1, wherein the historical data includes information regarding account payments made.

34. The method of claim 1, wherein the historical data includes events related to previous collection activities.

35. The method of claim 1, wherein the historical data includes collectors' notes related to previous collection activities.

36. The method of claim 35, wherein the collectors' notes use preformatted codes.

37. The method of claim 35, wherein the collectors' notes use a natural language format.

38. The method of claim 35, further comprising:
transforming the collectors' notes into a mathematical representation that encodes contextual similarity of terms contained in the collector's notes.

39. The method of claim 38, further comprising creating the mathematical representation using a vector model.

40. The method of claim 38, further comprising creating the mathematical representation by determining co-occurrence statistics of terms contained in the collector's notes.

41. The method of claim 38, wherein the mathematical representation is created using context vector methodology.

42. The method of claim 1, further comprising:
segmenting a portfolio of accounts into a plurality of segments; and
providing a different predictive model for each segment.

43. The method of claim 42, wherein each segment is based on a time period for which an account has been delinquent.

44. The method of claim 42, wherein each segment is based on credit-worthiness of the holder of a delinquent debt account.

45. The method of claim 42, wherein each segment is based on a type of debt of an account.

46. The method of claim 42, wherein each segment is based on a history of collection activities for an account.

47. The method of claim 42, wherein each segment is based on a statistical clustering of accounts having similar characteristics.

48. The method of claim 42, wherein each segment is based on an amount owed on an account.

49. The method of claim 42, wherein each segment is based on the collectors' notes for an account.

50. The method of claim 42, wherein each segment is based on a determination of whether a debt on an account has been charged-off.

51. The method of claim 42, wherein each segment is based on a number of collection agencies that have attempted to collect on the debt account.

* * * * *